Cont'd on Sheets 2b & 2c

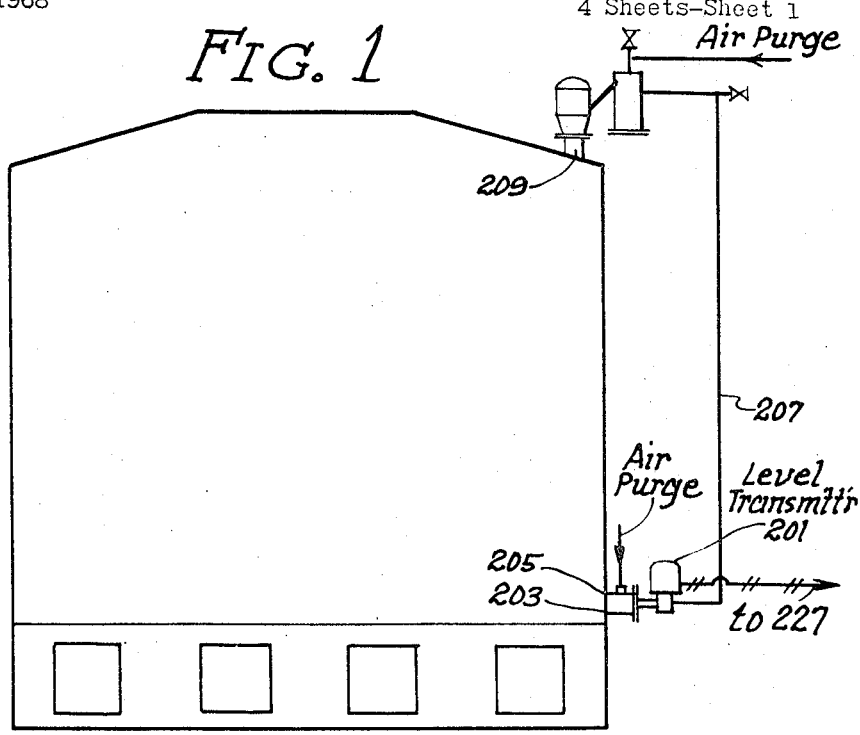
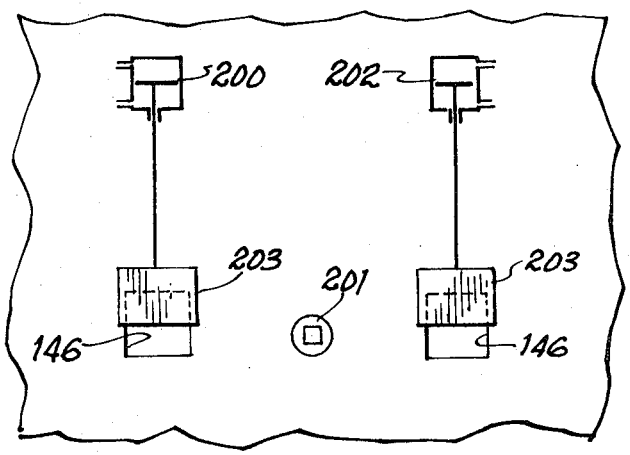

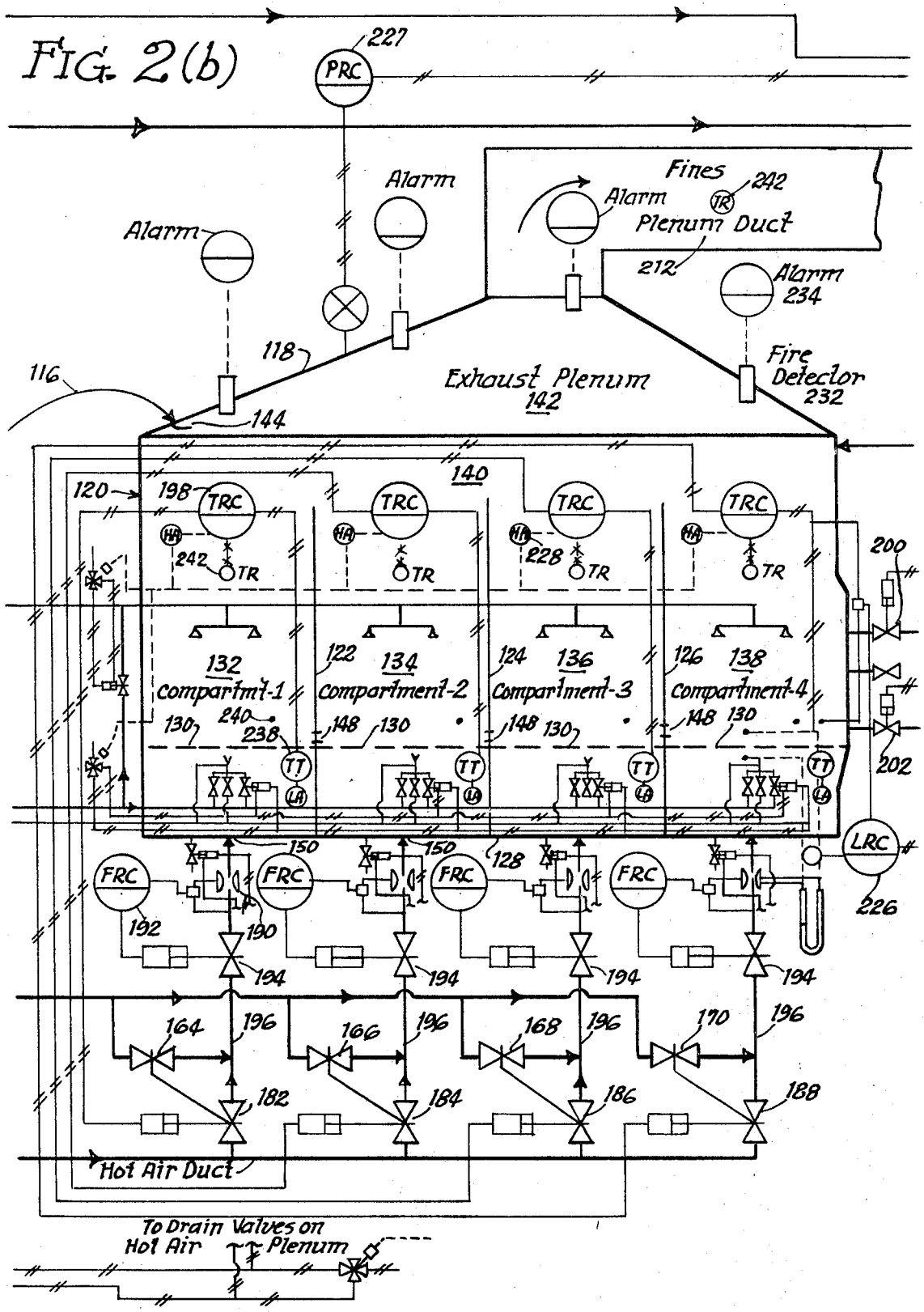

United States Patent Office 3,525,162
Patented Aug. 25, 1970

3,525,162
MEANS AND METHOD FOR DRYING WET ELASTOMERIC CRUMB
John F. Brewer, Ronald E. Shrader, and Louis C. Schilling, Baton Rouge, La., assignors to Copolymer Rubber & Chemical Corporation, Baton Rouge, La., a corporation of Louisiana
Filed Oct. 14, 1968, Ser. No. 767,250
Int. Cl. F26b 3/08
U.S. Cl. 34—10                                                 25 Claims

ABSTRACT OF THE DISCLOSURE

A method and means for drying elastomeric crumb which makes use of a fluid bed dryer subdivided into a plurality of compartments with temperature controls of the hot drying gases introduced into each compartment for fluidization to effect incremental removal of moisture from the crumb and for effecting uniform drying at relatively low temperature with means for measurement and control of the level of the fluid bed, the temperature of the hot drying gases introduced for drying and fluidization and the volume thereof.

---

This invention relates to the new and novel method and means for the removal of moisture from crumb formed upon coagulation of polymeric elastomeric materials, as by the addition of acidic aqueous medium.

One of the commercial processes for the polymerization of monoolefinic and polyolefinic monomers in the preparation of polymeric substances is a process for emulsion polymerization in aqueous medium, as represented by the preparation of SBR rubbers, wherein the formed polymeric component of the emulsion is coagulated by the addition of an acidic aqueous medium to form a wet crumb. Before packaging the crumb for shipment, it is essential to dewater the crumb and to dry the crumb by the removal of free water.

In the preparation of elastomeric copolymers, this has been accomplished by the combination of filters and pan dryers wherein a layer of crumb is advanced slowly through an air drying oven for the removal of residual moisture, and the combination which may also include an extractor for squeezing additional moisture from the crumb.

Such techniques for drying are subject to a number of deficiencies, particularly in the drying of wet crumb of elastomeric materials. The rate of moisture removal is relatively low whereby the yield of rubber per square foot of space required for the drying equipment is low. The amount of moisture removed per B.t.u. of heat introduced is also relatively low with corresponding increase in drying costs per unit weight of product. Considerable labor is required for repair and replacement of drying pans and their hinged connections, for cleaning the surfaces of the pans, as by brushing, to remove residual materials and for subsequent treatment of the surfaces of the pans with a release agent, such as silicone fluids, to minimize sticking of hot crumb to the heated surfaces of the pans.

Of considerable significance is the fact that the temperature required for moisture removal in pan dryers is relatively high with the result that such drying equipment is restricted to use with crumb of elastic material having relatively high Mooney numbers to avoid sticking or agglomeration at the elevated drying temperature. The crumb on the upper portions of the layers tend to insulate underlying portions whereby uniform exposure of the crumb to hot drying gases is difficult to achieve with the result that moisture removal is nonuniform and higher drying temperatures are required to the extent that portions of the crumb exposed to the higher temperatures tend to scorch under the operating conditions.

It is an object of this invention to provide a method and means for the removal of moisture from wet rubber crumb whereby moisture removal is effected in an efficient and economical manner; whereby moisture is removed uniformly from the crumb to a desired low moisture content or whereby moisture removal is effected at lower temperatures which can be carefully controlled to enable the drying technique of this invention to be employed with crumb of elastomeric material having low Mooney values; which does not require special treatment of surfaces to prevent sticking or the like, and in which the process is characterized by high yield per B.t.u. and high capacity per unit volume to provide increased production per unit space.

These and other objects of this invention will hereinafter appear and for purposes of illustration, but not of limitation, an embodiment of the invention is shown in the accompanying drawings, in which—

FIG. 1 is a schematic elevational view of a means embodying the practice of this invention for measurement of the bed level of fluidized crumb in the apparatus illustrated in FIG. 2;

FIG. 3 is a schematic elevational view of the exit portion of the crumb dryer shown in FIG. 2.

This invention is addressed to the drying of wet crumb of elastomeric material by means which makes use of a fluidized bed of the elastomeric crumb in a dryer and the controls for operation of the fluidized bed dryer for the efficient removal of water from the elastomeric crumb. While the concepts of this invention have application to the drying of wet crumb of elastomeric materials generally, independent of the specific composition or method of preparation of the elastomer and the formation of crumb thereof, it has particular application in the drying of wet crumb of elastomeric materials formed by emulsion polymerization and coagulation by admixture of acidic aqueous medium, and more particularly to crumb formed of the combinations of such elastomeric materials and carbon black to form black masterbatch crumb For a fuller description of the preparation of such elastomeric materials and the formation of wet crumb thereof, reference can be made to U.S. Pat. No. 3,055,856, issued Sept. 25, 1962, and entitled, "Aqueous Suspension of Carbon Black, Apparatus and Method for Preparing Same, Method for Mixing Same With Rubber and Product Obtained Thereby"; U.S. Pat. No. 3,079,360, issued Feb. 26, 1963, and entitled, "Process for Multistep Coagulation of Rubber Latices"; and U.S. Pat. No. 3,092,603, issued June 4, 1963, and entitled, "Method of Continuously Coagulating Rubber Latices With Fresh Coagulant and the Resultant Product."

The invention has application also to a wide variety of other elastomeric materials formed by emulsion polymerization or copolymerization of monoolefinic, conjugated diolefinic, or polyolefinic compounds and coagulatable from aqueous or solvent medium by the addition of water and the like to form crumb with EPDM rubbers such as described in the copending application of H. G. Ginn, Ser. No. 569,836, filed Aug. 3, 1966, and entitled, "Preparation of Elastomers."

It will be understood that the rubber crumb, processed in accordance with the practice of this invention, will include elastomers formulated to include desirable increments of carbon black or other fillers in the process generally referred to in the trade as "masterbatching" to provide a wet masterbatch crumb. In fact, the drying system of this invention finds unique application to masterbatch crumb in which carbon black has been included in the coagulated elastomeric polymer.

Figure 2A:
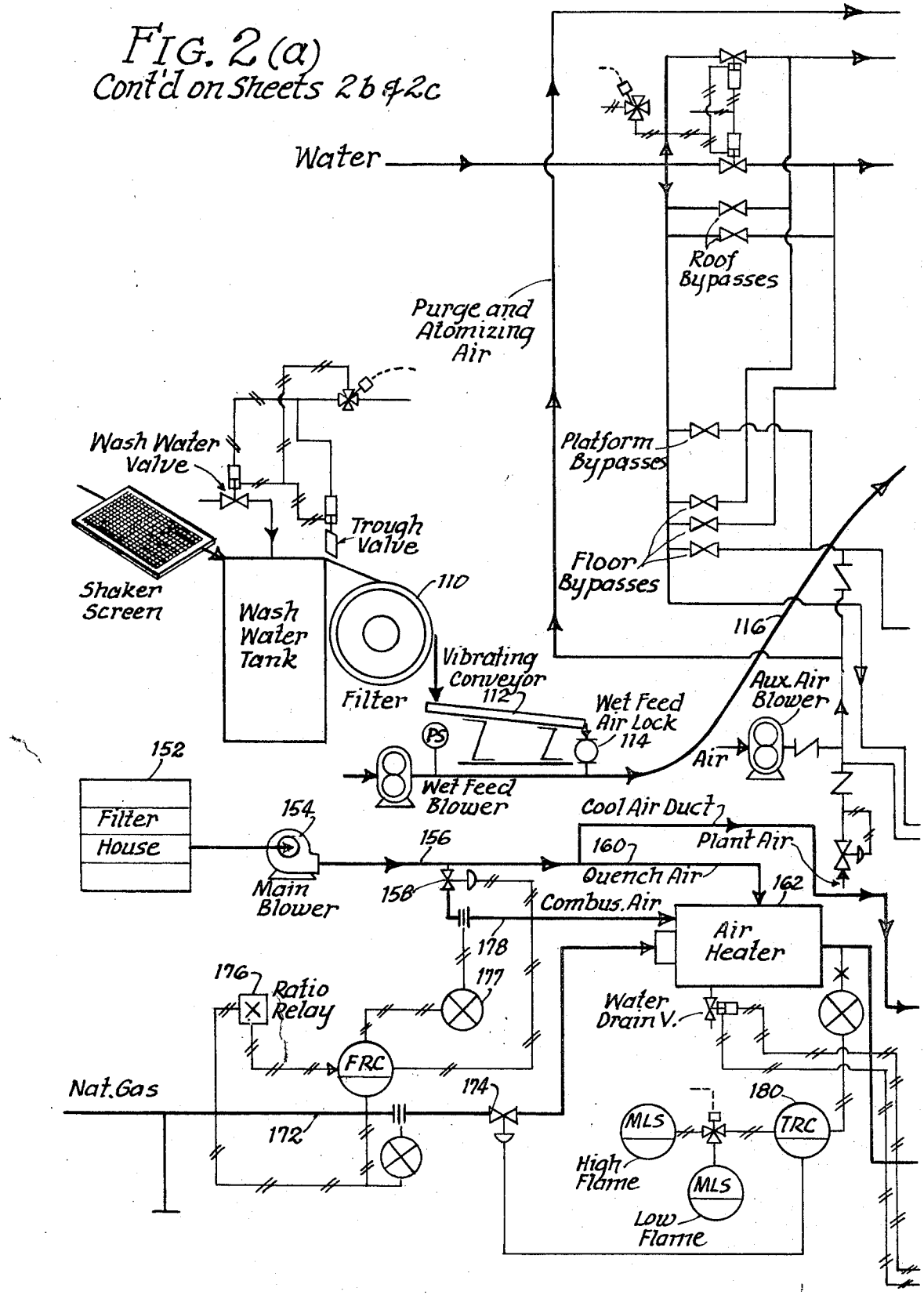
FIG. 2 (a–b) is a flow diagram showing the arrangement of apparatus and controls for dewatering and drying wet elastomeric crumb and which embodies the use of a fluid bed dryer in accordance with the practice of this invention.
Figure 2C:
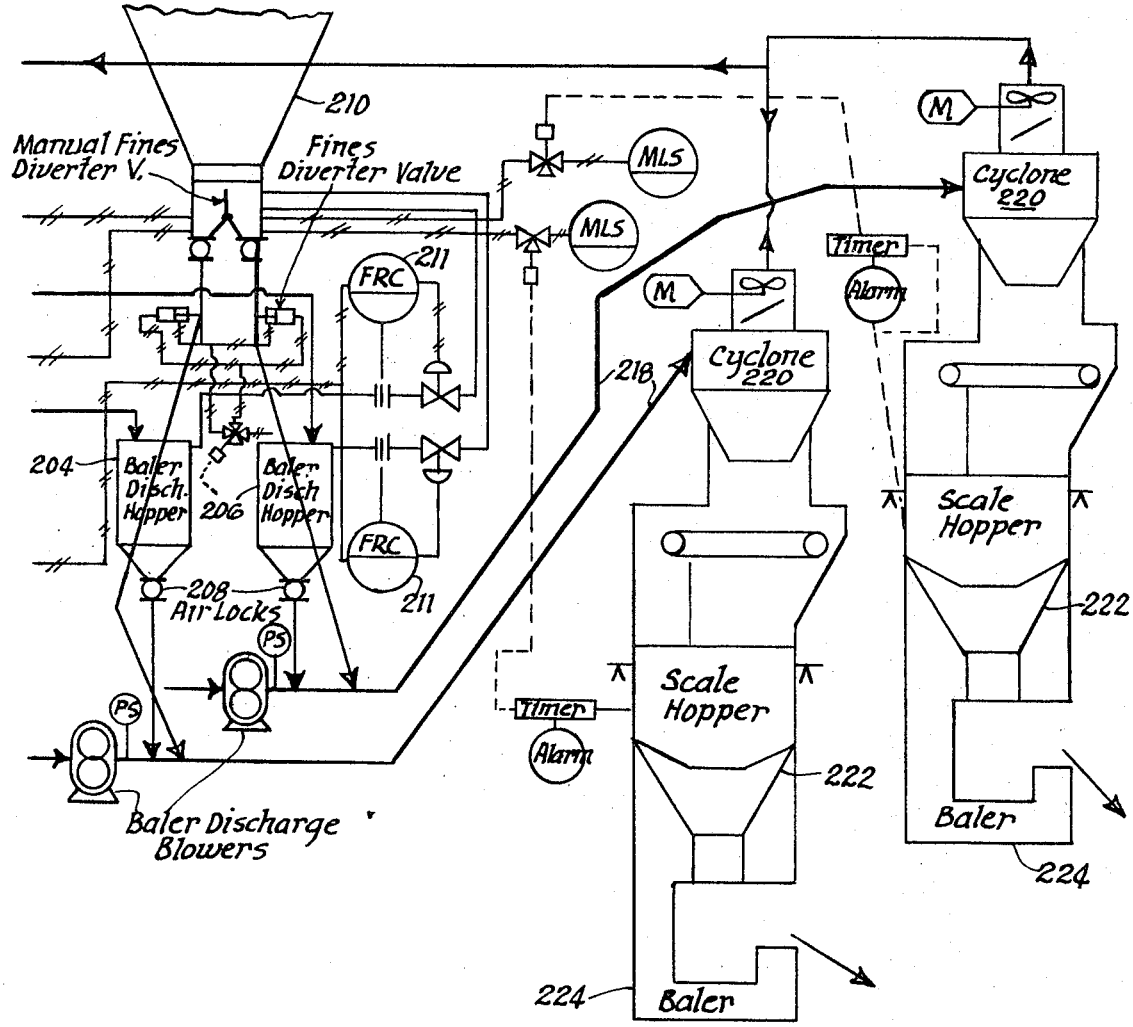

As described in the aforementioned patents and application, the formed polymer crumb is first washed with copious amounts of water to free the crumb of unreacted monomer and catalyst residue and then, as illustrated in FIG. 2 of the drawings, the crumb is dewatered to remove a major portion of the free water, as by means of a conventional filtering or decanting operation, preferably as a continuous operation using a rotary vacuum filter 110. The wet crumb scraped from the periphery of the filter will normally contain about 45% water, calculated on a wet basis. It is dropped from the filter onto the surface of a vibratory screening conveyor 112 which retains oversize of about ½ inch for processing while the underside is collected on the underlying shelf for vibratory conveyance to an air lock 114 at the entrance to a pneumatic tube 116 wherein the wet crumb is delivered to the dryer 118 for the removal of the remaining moisture, in accordance with the practice of this invention.

Moisture removal for drying the rubber crumb is carried out on a fluid bed principle wherein the crumb is maintained in a separated relation for complete and uniform exposure of the separated bodies to the hot drying gases used to fluidize the crumb whereby moisture removal is achieved in a uniform manner and at an accelerated rate, at temperatures capable of being controlled to avoid undesirable agglomeration of the rubber crumb and to avoid thermal degradation thereof. The fluid bed drying zone is sectionalized to balance the temperature and volume of drying gases, depending somewhat upon the moisture content and the Mooney value of the rubber crumb to provide for incremental removal of moisture under optimum drying conditions for delivery of a uniformly dry and stable product which is substantially free of scorching or degradation. Detailed description will hereinafter be made with respect to the compartmentalized fluid drying system and controls for the drying of rubber crumb in accordance with the practice of this invention.

The fluid bed dryer is illustrated in the form of a housing 120 of rectangular shape with vertically disposed internal partitioning walls 122, 124 and 126 extending crosswise of the housing from the bottom wall 128 through the spreader or grid plates 130 for a distance short of the top wall of the housing to subdivide the housing into a series of compartments 132, 134, 136 and 138 which are joined in the area 140 above the partitioning walls and which lead into a common exhaust plenum chamber 142 at the top.

The flow of crumb through the housing is from an inlet 144 through an upper portion of the housing into the first compartment 132 and from outlets 146 through the wall of the last compartment 138 immediately above the grid plate 130 with the flow from one compartment to the next through passages 148 in the partitioning walls immediately above the grid plates whereby one compartment communicates with the other adjacent thereto. When the crumb is maintained in a fluidized state within the housing, the flow of crumb from one compartment to the other is in the manner of fluid flow whereby the crumb in each compartment seeks a substantially common level.

Beneath the distributor grid plates 130, each compartment is provided with an inlet 150 for the hot gases which are forced under pressure upwardly through the grid plates in an amount to fluidize the crumb and effect moisture removal therefrom. The hot drying gases introduced through inlets 150 below the grid in each compartment for fluidization of the crumb are in the form of hot filtered air drawn through a filtering unit 152 by blower 154 which delivers clean air under pressure to line 156. A portion of the filtered air is made available as combustion air in amounts controlled by valve 158. Another portion of the filtered air is advanced under pressure through line 160 for passage in heat exchange relation through the air heater 162 to heat the air. It will be understood that the hot gases may be heated by means other than a gas heater, such for example by electrical heaters or by heat exchange liquids passed in heat exchange relation to the filtered air advanced as hot air for fluidization and drying.

A third increment of filtered air is utilized for blending with the heated air in amounts controlled by valves 164, 166, 168 and 170 for each compartment to regulate the temperature of the drying gases introduced into the respective compartments for fluidization of the crumb and for drying.

The mixture of combustion gases and hot air issuing from the outlet of the gas heater is preferably maintained at constant temperature, preferably at a temperature selected to be higher than the maximum temperature of gas introduced into any of the compartments, such as at a temperature of about 700° F. This is achieved by adjustment of the flow rate of gas through line 172 to the gas burners by the control valve 174. In order to maintain an excess of air in the combustion chamber, a flow rate signal from the natural gas operates a manually set flow ratio relay 176 which automatically operates to adjust the valve 158 for controlling combustion air flow through line 178 to the burners. The temperature recorder controller 180 in communication with the outlet gas is equipped with an override which, in the event of fire in the dryer or other upset in the conditions of operation, will automatically trip to turn the burners down to a low flame setting.

The temperature of hot gases introduced into each compartment is controlled by valves 164, 166, 168 and 170, respectively, which regulate the amount of cold filtered air blended with the hot gases to provide the desired temperature for the composite of drying gases admitted into the respective compartments.

The flow rate of hot gases into each compartment is measured and controlled by a venturi 190 connected to a flow recorder controlled 192 which controls a diaphragm motor operated valve 194 in each of the main lines 196 for the total hot gas stream to each compartment. The total flow to each compartment is preferably temperature compensated by the below grid temperature to give constant mass flow.

The temperature above the bed in each compartment is controlled by a temperature recorder controller 198 which operates the valves 164, 166, 168 and 170, previously described for the respective compartments. Any event which tends to lower the above bed temperature will thus automatically increase the rate of hot and cold air blended for introduction into the compartment. This will operate to increase the below grid temperature with corresponding increase in the above bed temperature and vice versa.

The crumb level in the fluidized bed dryer and the rate of output from the dryer is controlled by a level transmitter 201 (see FIGS. 1 and 3), having a diaphragm 203 across an opening 205 through the compartment wall immediately above the spreader plate. The level control means is preferably located in the last compartment for measurement of the pressure differential through the conduit 207 which communicates the diaphragm covered opening 205 with another diaphragm covered opening 209 at the top of the compartment, above the fluid bed, thereby to measure the pressure drop across the bed. The level transmitters are connected to record the pressure differential, as related to bed level, and with the level transmitter 201 connected to a level recorder controller 211.

The outlets are illustrated in FIG. 3 as two or more rectangular openings 146 through the wall of the last compartment and arranged to extend upwardly from adjacent the surface of the spreader plate. Located within said openings are slide plates 203 operatively connected to fluid motors 200 and 202 respectively for vertical movement of the slide plates between raised and lowered positions, in the manner of gate valves, to open and close the outlet openings respectively and for adjustment of the size of the outlet openings for varying the rate of delivery of dried crumb from the dryer. The crumb discharges into containers 204 and 206 equipped with air lock valves 208. Pressure within the containers is controlled by regulating the amount of air bled from the containers for return to the cyclone separator 210, as controlled by the flow recorder controller in connection with each line from each container.

The spent gases are exhausted from the plenum chamber 142 through a plenum duct 212 to a cyclone separator 210 which separates the fines from the gases. The latter is exhausted upwardly through the vent 214 fitted with an exhaust blower 216 for returning the cleaned gas to the atmosphere. The fines, separated in the cyclone, are added to the dried crumb issuing from one or the other of the containers through the air lock 208 and pneumatically conveyed with the dried crumb through the pneumatic tubes 218 to cyclone separators 220 which extract the dried crumb and fines for delivery onto a scale hopper 222 for weighing a measured amount of dried crumb into baler 224 which produces a weighed block of the dried crumb for packaging and shipment.

In the event that the baler or scales become inoperative, or in the event that one of the pneumatic lines from the dryer is shut down, the sliding gate valve 200 or 202 will automatically shut in the line in which the trouble has been developed. With one line out of operation, the bed level in the dryer will normally automatically tend to rise. This condition will be sensed by the level recorder controller 226 in each of the compartments which, in turn, will change the set point on the flow controller of the operating line further to open the gate valve and allow more crumb to be discharged through the delivery opening. In order to avoid overloading of the line, a point is set on the controller for determining the maximum capacity of crumb in the operating line.

When the deficiency is corrected, control is returned to the level controller and the flow controller. During such time that the level is at the desired height, a maximum capacity of crumb, set on the flow controller, will flow through both lines until the level drops and the level controller 226 regains control and thereafter adjusts the set point on the flow controllers for continuous normal operation. In the event that the difficulty is not overcome relatively quickly (20–30 minutes), the feed to the dryer is discontinued. The level controller has a high level alarm 228 which signals when the bed level reaches excessive height.

The presure above the bed in the dryer is controlled by pressure recorder controller 227 which controls operation of an air motor 229 for regulating the exhaust air damper 230. Usually the control point is about ½ inch to 1 inch of water vacuum.

Fire protection consists of ultraviolet detectors 232, high temperature alarms 234 on the above bed temperatures, low temperature alarms 236 connected to below grid temperature control 238 and high temperature alarms 240 on thermocouples of the multipoint recorders 242 which are located in the bed and in the cyclone inlet and outlet ducts. The high temperature alarm points are set to sound an alarm and release water in the dryer and cyclone. The ultraviolet detectors and low temperature alarms are set to sound an alarm but without the release of fire water in the dryer or cyclone. Water is atomized with air to permit better flow through the grid.

It will be understood that the concepts of this invention may be practiced with a dryer having more than four compartments but it is important to make use of a dryer having at least three compartments through which the rubber crumb flows in sequence. It is desirable to reduce the crumb to the desired degree of dryness before the crumb reaches the last compartment in the series and to rely on the last compartment for homogenization of the crumb and for reducing the temperature of the crumb to a lower level for delivery to the baler and packaging.

As the amount of moisture is reduced, the temperature in the fluidized beds can be increased without fear of reducing the crumb to a fluid or sticky state which might otherwise lead to agglomeration. Thus, the temperature levels for the drying can be increased from the first compartment to the next to expose the crumb to higher volatilization temperatures as the amount of contained water decreases thereby to compensate for the reduction in contained moisture as drying proceeds until a temperature sufficiently high to effect drying can be maintained in the final drying compartment. It is desirable to remove the maximum amount of moisture in the first and second compartments.

In the drying of masterbatch crumb containing 45% by weight water on a wet basis or 45 parts of water per 55 parts by weight of rubber, in a fluid bed dryer having a series of four compartments, a typical set of conditions may be represented by the following.

The temperature of the fluidized bed in the first compartment is maintained at 130° F., in the second compartment 140° F. and in the third and last compartments 180° F. To provide for a temperature of 130° F. in the fluidized bed in the first compartment, the below grid temperature is maintained within the range of 200–600° F., and preferably within the range of 400–600° F. and about 40% of the original water is removed in the first compartment to provide a crumb containing 33% moisture on the wet basis to the second compartment. To provide a temperature of 140° F. in the fluidized bed of the second compartment, the below grid temperature is about the same as in the first and again about 40% by weight of the original moisture is removed to provide a crumb having about 14% by weight moisture on a wet basis to the third compartment. To provide a temperature of 180° F. in the fluidized bed of the third compartment, the below grid temperature is maintained within the range of 200–600° F. and preferably 300–500° F. and the moisture removed amounts to about 20% of the total water in the wet crumb to provide a crumb having about 0.5% moisture to the fourth compartment. To provide a temperature of 180° F. in the fluidized bed of the fourth compartment and, since little if any heat is utilized for volatilizing off moisture, it is only necessary to make use of a below grid temperature of about 180–200° F.

As the moisture content decreases the air rate necessary to fluidize the bed of crumb also decreases so that the rate of introduction of hot gases decreases from the first compartment to the last, such as in the ratio of 11–10–9–7 for the successive compartments.

The following example, which is given by way of illustration, but not by way of limitation, describes the preparation of a rubber crumb and its processing to effect drying in accordance with the practice of this invention.

EXAMPLE 1

Masterbatch crumb prepared in the usual manner was passed to a washing zone and then to the rotary filter 110 where the major portion of wash water was removed to leave a wet crumb containing about 45% water on the wet basis. The dewatered crumb was delivered from the filter onto a vibratory conveyor and classifier 112 which removed crumb in excess of ½ inch. From the conveyor, the crumb passed through the air lock 114 into a pneumatic conveyor 116 which delivered the dewatered crumb to the fluid bed dryer 118.

At the base, the dryer was 5 feet wide and 20 feet long and was divided into four compartments 132, 134, 136 and 138 with each compartment being 5 feet square in cross section and 8 feet high. A grid was provided at the bottom of each compartment through which heated air was forced to fluidize and dry the crumb. The heated air was obtained from a 40,000 c.f.m. 350 HP blower 154 and a 25 million B.t.u. per hour natural gas fired air heater 162. A constant temperature of 700° F. was maintained on the outlet of the heater by controlling the natural gas flow to the burners. Combustion air was automatically controlled in ratio to the natural gas by a flow controller 177 and a ratio relay 176. The heated air rate to each compartment was measured by a venturi type meter 190 and controlled by flow controllers 192.

25,450 pounds per hour of crumb having 45% moisture on a wet basis was dried under the following operating conditions. The feed entering the dryer contained 11,450 pounds of water to 14,000 pounds of rubber crumb on an hourly basis. The fluidized bed temperature in the first compartment was maintained at 130° F. and the air rate was maintained at 11,000 s.c.f.m. The below grid temperature was 510° F. Under these conditions, approximately 40% of the total water entering the dryer, or 4580 pounds of water, was removed in the first compartment to yield a crumb having a moisture content of about 33% on the wet basis.

The second compartment was operated to remove approximately 40% of the total water entering the dryer with the feed. The fluidized bed temperature in the second compartment was maintained at about 140° F. with an air rate of 10,000 s.c.f.m. The required below grid temperature for removal of the 4580 pounds of water was 520° F. to yield a crumb having a moisture content of 14% on a wet basis.

The fluidized bed temperature in the third compartment was maintained at 180° F. The below grid temperature was about 420° F. The air rate to the third compartment was controlled at 9,000 s.c.f.m. Under these conditions, the remaining moisture, corresponding to about 20% of the total water entering the dryer or about 2290 pounds is removed in the third compartment to yield a crumb having about 0.5% by weight moisture.

The fluidized bed temperature in the fourth compartment was maintained at about 180° F. Since this compartment is used primarily for heating or cooling the crumb and since very little water is volatilized off, it was sufficient to make use of a below grid temperature of about 180–200° F. Air flow rate to this compartment was 7000 s.c.f.m. and the moisture content of the crumb from the fourth compartment was about 0.35% by weight.

The crumb bed level and therefore the residence time in the dryer was controlled by maintaining a constant pressure drop across the fluidized bed at about 15 inches of water pressure. This is equivalent to a height of the crumb during fluidization of about 4 feet and corresponds to a residence time in the dryer of about 30 minutes.

The dried crumb is discharged from the fluid bed dryer through two sliding gate valves 146 having fixed openings and the dried crumb is discharged into crumb hoppers 204 and 206 equipped with air lock valves 208 through which the dried crumb is fed to a pneumatic discharge system 218. The flow of air out of these compartments and out of the dryer is regulated by flow controllers having their control point pneumatically set by a level controller which indicates bed level. Fines which are entrained in the fluidizing air are recovered by a cyclone 210. A 50,000 c.f.m. blower is utilized on the cyclone to maintain atmospheric pressure or slightly below the bed in the dryer.

The total heat requirement of the dryer was approximately 20 million B.t.u. per hour. The efficiency in cubic feet of natural gas per pound of water removed was calculated to be about 1.86.

The crumb delivered by the pneumatic conveyors 218 was automatically separated out and deposited on weighing scales 222 and then baled by the baler 224 for packaging and delivery.

It will be apparent from the foregoing that we have provided a drying system capable of continuous operation in connection with a continuous process for elastomer preparation wherein the dryer is capable of efficient and rapid removal of moisture from the polymer crumb without exposure of the crumb to excessive temperatures and without agglomeration of the crumb to introduce interferences with the continuous efficient operation.

It will also be apparent from the foregoing that the drying technique and apparatus, embodying the practice of this invention, is capable of being practiced with a minimum amount of equipment and maintenance and with a minimum amount of labor thereby to produce a more desirable and uniform product at minimum cost from the standpoint of labor, equipment and original investment.

It will be understood that changes may be made in the details of construction, arrangement and operation without departing from the spirit of the invention, especially as defined in the following claims.

We claim:
1. In a method for drying wet elastomeric crumb, the steps of passing the crumb continuously, sequentially through a plurality of compartments within a housing from an inlet at one end to an outlet at the other end, introducing hot gases into each compartment through a distributor in the bottom end portion to fluidize the crumb in each compartment for removal of an increment of water contained in the crumb during passage of the crumb through at least all but the last compartment, maintaining the temperature in each compartment with temperature increase in each compartment from the first compartment to at last all but the last compartment, feeding wet crumb into the first compartment through the inlet at a level above the bed of crumb when in the fluidized state, withdrawing dried crumb from the last compartment through the outlet at a level below the level of the bed of crumb when in the fluidized state, communicating the compartments one with the other below the level of the fluidized bed for passage of crumb from one compartment to the next by fluid flow, and measuring the pressure drop across the fluidized bed for controlling the level of the bed and the rate of delivery of dried crumb from the dryer.

2. The method as claimed in claim 1 in which the temperature of the fluidized bed in each compartment is maintained by supplying a hot gas to each compartment at a temperature above the maximum temperature in any compartment, blending a colder gas with the hot gas introduced into each compartment in an amount to adjust the temperature of the gases to the temperature necessary for maintaining the desired temperature in the fluidized bed of the particular compartment.

3. The method as claimed in claim 2 in which the hot gases are heated by a heater burning combustion gas and in which the temperature of the hot gases supplied to the compartments in admixture with the colder gas is controlled by varying the flow rate of combustion gas to the burners.

4. The method as claimed in claim 3 in which the gas burners are turned down to low flame setting in the event of fire within the drying zone or other disturbance to the continuous drying operation.

5. The method as claimed in claim 1 which includes the step of varying the rate of flow of the hot drying gases into each compartment in accordance with the moisture content of the crumb in each compartment.

6. The method as claimed in claim 5 in which the rate of flow of hot gases into each compartment is decreased per square foot of cross section of compartment from the first compartment to the next.

7. The method as claimed in claim 1 which includes the step of separating the fines entrained with the hot drying gases exhausted from the compartments.

8. The method as claimed in claim 1 which includes the step of increasing the rate of removal of dried crumb from the last compartment in response to a rise of the fluidized bed beyond a predetermined level and decreasing the rate of removal of dried crumb from the last compartment in response to a drop of the fluidized bed below a predetermined level.

9. The method as claimed in claim 1 which includes the step of controlling the pressure in the compartments by varying the exhaust of hot drying gases from the compartments.

10. The method as claimed in claim 1 which includes the step of homogenizing the dried crumb during passage through the last compartment.

11. A dryer for wet elastomeric crumb comprising a housing, a plurality of spaced partitioning walls extending upwardly from the bottom wall of the housing to a height greater than the level of a fluidized bed generated within the housing to subdivide the housing into a plurality of compartments, hot gas inlet means in communication with the bottom portion of each compartment for the introduction of hot gases under pressure, a distributor across the bottom portion of each compartment for distribution of hot drying gases introduced to fluidize the bed of crumb in each compartment, an inlet means above the level of the fluidized bed for introduction of wet crumb into the first compartment, adjustable outlet means below the level of the fluidized bed in the last compartment for removal of dried crumb, passages through the partitioning walls below the level of the fluidized bed but above the distributor for flow of elastomeric crumb from one compartment to the next, means for feeding hot gases to each of the hot gas inlets, means for heating the hot gases to a temperature above the highest temperature of the fluidized bed in any compartment, means for blending colder air with the hot gases for temperature adjustment of the hot drying gases introduced into the hot gas inlets, means for measuring the temperature of the fluidized bed of crumb in each compartment, means for varying the amount of colder air blended with the hot gases responsive to the temperature of the fluidized bed in the respective compartments, means for measuring the pressure drop through the fluidized bed, and means responsive to said last measuring means for adjustment of the outlet means to vary the rate of flow of dried crumb from the housing.

12. A dryer as claimed in claim 11 in which the means for heating the hot gases comprises a gas burning heater.

13. A dryer as claimed in claim 12 which includes means for measuring the temperature of the hot gas delivered from the heater and means for varying the amount of combustion gas fed to the burners responsive to variation of the temperature of the hot gas issuing from the heater to maintain the temperature thereof at a predetermined level.

14. A dryer as claimed in claim 12 which includes means for feeding combustion air to the gas heater for admixture with the combustion gases and means responsive to the rate of feed of combustion gas automatically to adjust the rate of feed of the combustion air to maintain a constant ratio therebetween.

15. A dryer as claimed in claim 11 which includes means for detecting fire or other emergency in the operation of the dryer and means responsive to actuation of said detection means for adjustment of the gas burners to a low flame setting.

16. A dryer as claimed in claim 11 in which the temperature in the successive compartments increases from one compartment to the next in the direction of the flow of crumb through the dryer.

17. A dryer as claimed in claim 11 which includes means for maintaining constant pressure drop across the fluidized bed in each compartment to maintain the fluidized bed in each compartment at a uniform level.

18. A dryer as claimed in claim 11 in which the outlet means comprises openings through the outer wall of the last compartment immediately above the distributor, slide plates mounted for sliding movement relative to said opening between open and closed positions, and means operatively connected to said slide plates for displacement thereof.

19. A dryer as claimed in claim 18 which includes a gate associated with each of said outlet openings and controller means set to define the maximum opening of said gates for control of the flow rate of dried crumb from the dryer.

20. A dryer as claimed in claim 11 which includes air lock valves in passages communicating with the inlet and outlet means for passage of crumb therethrough into and out of the housing to maintain a pressure level within the housing.

21. A dryer as claimed in claim 11 which includes an outlet plenum chamber in the upper portion of the housing in communication with each of the compartments.

22. A dryer as claimed in claim 21 which includes means for exhausting spent drying gases from the outlet plenum chamber, a separator in communication with the plenum chamber for separation of solids from the exhaust gases, means for release of the cleaned spent gases from the separator into the atmosphere and means for returning the solids for admixture with the dried crumb delivered from the housing.

23. A dryer as claimed in claim 11 which includes fire detectors within the housing and the plenum chamber for detection of any fires existing therein.

24. A dryer as claimed in claim 11 which includes means for measuring temperature above the fluidized bed in each compartment, within the fluidized bed in each compartment and below the fluidized bed in each compartment and alarm means responsive to said temperature measuring means for signalling temperatures beyond a predetermined level by any of said temperature measuring means.

25. A dryer as claimed in claim 19 which includes means for measuring the level of the fluidized bed and means responsive to said level measuring means for increasing the gate opening to increase the flow rate of crumb from the housing when the fluidized bed exceeds a predetermined level and for decreasing the gate opening to decrease the flow rate of the crumb from the housing in response to the fall of the flundized bed to below a predetermined level.

References Cited

UNITED STATES PATENTS

| 2,876,557 | 3/1959 | Ducatteau. | |
|---|---|---|---|
| 3,186,102 | 6/1965 | Brociner et al. | |
| 3,360,867 | 1/1968 | Sanderson | 34—10 |

FOREIGN PATENTS

| 947,673 | 1/1964 | Great Britain. |
|---|---|---|
| 1,345,666 | 11/1963 | France. |

DONLEY J. STOCKING, Primary Examiner

R. A. DUA, Assistant Examiner